March 17, 1953 A. D. LA RUE 2,632,131

TUNABLE MAGNETRON

Filed May 31, 1951 3 Sheets-Sheet 1

INVENTOR
ALBERT D. LARUE
BY Elmer J. Gorn
ATTORNEY

INVENTOR
ALBERT D. LARUE
BY Elmer J. Gorn
ATTORNEY

March 17, 1953 A. D. LA RUE 2,632,131

TUNABLE MAGNETRON

Filed May 31, 1951 3 Sheets-Sheet 3

INVENTOR
ALBERT D. LARUE
BY [signature]
ATTORNEY

Patented Mar. 17, 1953 2,632,131

UNITED STATES PATENT OFFICE 2,632,131

TUNABLE MAGNETRON

Albert D. La Rue, Lexington, Mass., assignor to Raytheon Manufacturing Company, Newton, Mass., a corporation of Delaware Application May 31, 1951, Serial No. 229,176

13 Claims. (Cl. 315—40)

This invention relates to electron-discharge devices, and more particularly to microwave magnetron-discharge devices having variable tuning structures.

In copending application of Erich N. Kather, Serial No. 228,401, filed May 26, 1951, entitled Tunable Magnetron, there is disclosed a microwave cavity magnetron which is tuned by a tuner structure comprising a plurality of tuner elements, each of said tuner elements being adapted to be inserted in a different cavity of the magnetron. It is disclosed therein that tuner resonances may be prevented from interfering with the operating frequency of the magnetron by making the spaces between the tuner elements slots of different depth. This, in effect, creates a rising sun resonator structure which may be considered roughly equivalent to tightly coupled, stagger tuned, parallel resonant circuits.

In order to utilize the principle of the rising sun tuner structure in a magnetron device operable over a wide range of frequencies, it has been found that the difference in length of the slots between the tuner elements must be made quite large in order to get the desired separation of the tuner resonances to points which lie on either side of the operating frequency of the magnetron.

This invention discloses that the length of the longer slots may be shortened while still preserving the same tuning range by terminating the longer slots in apertures whose widths are substantially greater than the widths of the slots. These apertures load the slots such that they are electrically equivalent to slots of a considerably greater length.

This invention further discloses that improved rising sun tuner results may be obtained by the utilization of tuner configurations having spaces between the tuner elements which may be divided into three or more groups of different shaped spaces.

In one modification of the invention disclosed herein, the tuner structure comprises tuner elements separated by three different groups of spaces. A first space is a slot extending into the tuner structure for substantially the distance of the tuner element. A second space is a slot extending into the tuner structure for substantially the entire distance thereof, leaving merely a support ring at the top of the tuner structure. A third space comprises a slot terminating in a rectangular hole in the upper part of the tuner structure. Successive tuner elements are separated by a space of a different one of the three groups.

In a further embodiment of this invention, the tuner elements are separated by two groups of spaces, one space comprising a slot extending through the tuner element, and the other space comprising a slot terminating in a rectangular aperture, the spaces of one group being alternately positioned with respect to the spaces of the other group.

In a still further modification of this invention, the tuner elements are separated by groups of spaces, one group of spaces comprising slots terminating in rectangular apertures, and the other group comprising slots extending through the tuner structure, there being two slots of the spaces of the second group between every adjacent pair of spaces of the first group.

In still another modification of this invention, tuner elements are separated by spaces divided into two groups, the first group comprising slots terminating in rectangular apertures, and the second group comprising slots extending through the tuner elements, there being three slots of the spaces of the second group between every adjacent pair of spaces of the first group.

Other and further objects and advantages of this invention will become apparent as the description thereof progresses, reference being had to the accompanying drawings, wherein.

Figure 1:
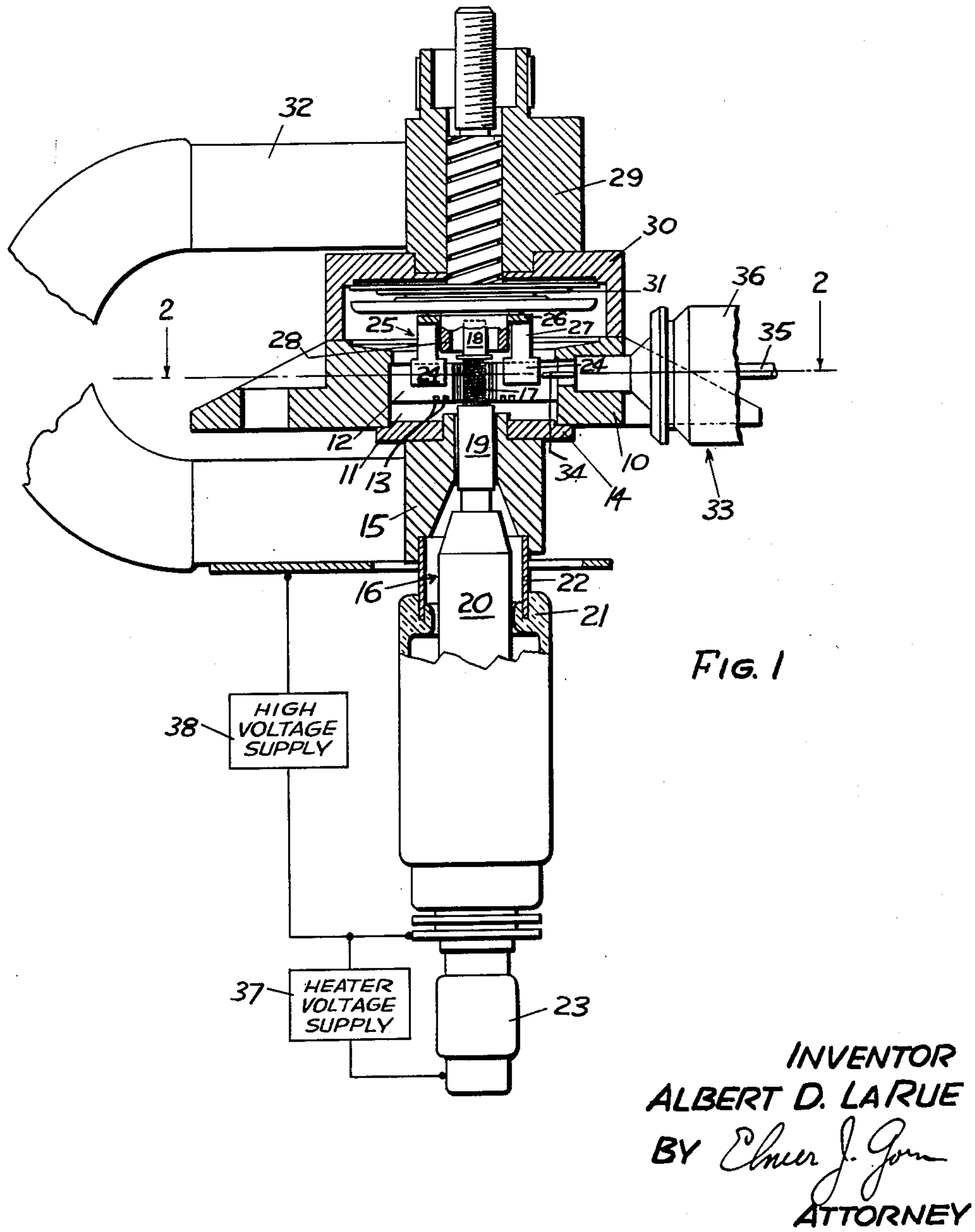
Fig. 1 illustrates a longitudinal, partial cross-sectional view of an electron-discharge device embodying this invention.
Figure 2:
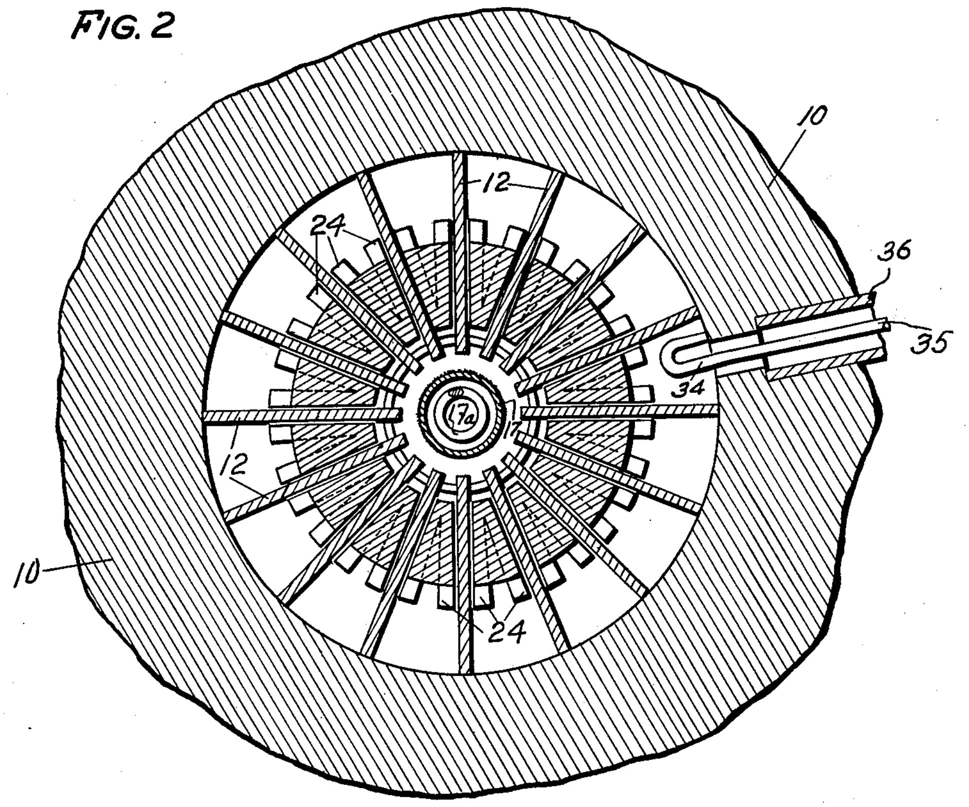
Fig. 2 illustrates a partially broken away, transverse, cross-sectional view of the device shown in Fig. 1, taken along line 2—2 of Fig. 1.
Figure 3:
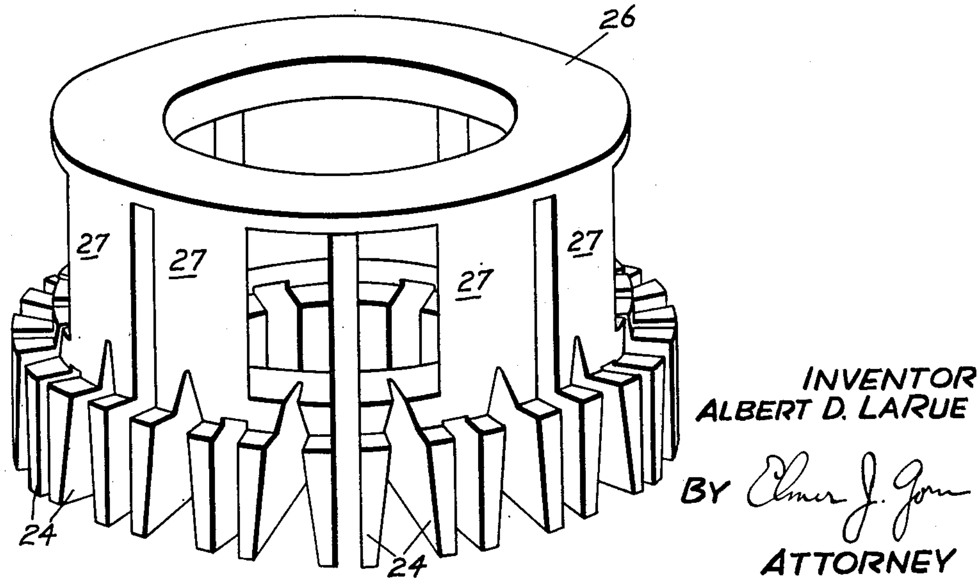

Fig. 3 illustrates a perspective enlarged view of the tuner structure used in the device, illustrated in Figs. 1 and 2; and Figs. 4, 5, 6 and 7 illustrate development view of various modifications of tuning structures which could be used in the device of Figs. 1 and 2.

Referring now to Figs. 1, 2 and 3, there is shown a magnetron-discharge device comprising an anode block 10 having a cylindrical hole 11 therein. Extending radially inwardly from the sides of hole 11 is a plurality of anode vanes 12 which are positioned symmetrically about the axis of hole 11. As shown here, anode vanes 12 are substantially rectangular members of conductive material such as copper which are rigidly secured to the surface of hole 11 and which extend to a point somewhat short of the axis of hole 11. The lower edges of anode vanes 12 are alternately connected adjacent their inner ends by conductive strapping, as at 13, to prevent operation of the device in spurious modes. The lower end of hole 11 is covered by an end plate 14 which is attached to anode block 10, for example, by soldering. Positioned on plate 14, and extending through an aperture therein, is a magnetic pole piece 15. Extending through an aperture in pole piece 15 is a cathode structure 16, which is cylindrical in form, and is positioned axially of the hole 11. The cathode structure 16 comprises a support cylinder 17 coated with electron-emissive material at the point where said cylinder passes between the ends of anode vanes 12. The upper end of cylinder 17 is connected to a conductive hat 18, the edges of which extend out beyond the electron-emissive material 17. A cylinder 19 surrounds and engages the cathode cylinder 17 below the electron-emissive portion, cylinder 19 in cooperation with hat 18 substantially preventing movement of electrons from the cathode of the anode structure in a direction axially of the hole 11. Cylinder 19 extends through the aperture in lower pole piece 15 and is spaced therefrom. Cylinder 19 is attached to a lower support member 20 which is connected through a glass support seal 21 coaxial with support member 20 to a metallic cylinder 22 which, in turn, is rigidly connected to lower pole piece 15. Support member 20, which is hollow, contains a conductor therein which is insulatedly supported with respect thereto by a ceramic seal 23, said inner conductor being connected to one end of a cathode heater 17*a* which is positioned inside the cathode cylinder 17 adjacent the electron-emissive coating, the other end of said heater 17*a* being connected to the end hat 18. The details of the cathode structure are illustrated and described herein by way of example only, and any desired cathode structure may be used.

Extending downwardly into the cavity formed by the anode vanes 12 is a plurality of tuner elements 24 which is supported by the body of a tuner structure 25. Tuner structure 25 comprises an upper ring 26 and a cylindrical support member 27 extending downwardly therefrom, the tuner elements 24 being attached to the lower edge of the support cylinder 27. Support cylinder 27 has different shapes and sizes of slots and apertures therein which extend upwardly between the tuner elements. Tuner structure 25 is rigidly attached to a movable magnetic support rod 28 which extends upwardly through an upper magnetic pole piece 29 and is attached to any desired mechanical structure, not shown, for moving the magnetic rod longitudinally of the axis of the hole 11. Upper pole piece 29 is rigidly attached to an upper cover plate 30 which, in turn, is sealed to the anode block 10. A vacuum seal is maintained between the cover 30 and the magnetic support rod 28 by means of a bellows arrangement 31. It is to be clearly understood that the type of bellows arrangement and tuner support structure may be of any desired type.

A permanent magnet 32 is provided which, as shown here, is of the horseshoe type whose poles are positioned, respectively, adjacent upper and lower magnetic pole pieces 15 and 29. A signal output structure 33 is provided comprising a pick-up loop 34 extending into one of the cavities between the anode vanes 12, one end of the loop being connected to the anode block 10, and the other end of the loop extending out through a hole in the anode block 10 to form the central conductor 35 of a coaxial line. A vacuum seal is provided between the central conductor 35 and an outer conductor 36 of said line which is sealed in the anode block 10, for example, by soldering.

When a suitable heater voltage is applied to the cathode heater, for example, by means of a heater voltage supply 37, and a suitable high voltage is applied between the cathode and anode, for example, by means of a high voltage supply 38, the device will oscillate at a frequency determined by the dimensions of the cavities formed by the anode vanes 12 and the position of the tuner structure 25 relative to said cavities. The particular elements illustrated herein are positioned at the inner ends of the anode vanes 12, and hence affect the equivalent capacity of the cavities. However, any other desired type of tuning may be used such as, for example, slug or inductance tuning, or a combination of inductance and capacitance tuning.

Figure 4:
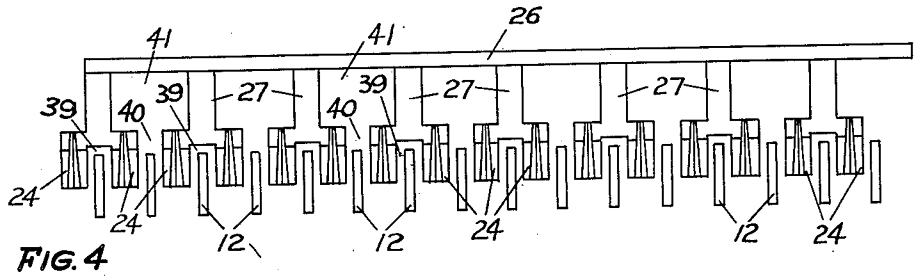

Referring now to Fig. 4, there is shown a development view of a tuner structure employing the rising sun principle for spreading the tuner resonances on either side of the operating frequency of the device. This development is merely a spreading out in linear form of the elements which appear in circular form in the illustrations of Figs. 1 through 3. At the top there is shown the support ring 26 depending from which is the cylindrical support member 27. Attached to the lower end of the support member 27 are the tuner elements 24 which are inserted between the anode vanes 12. The tuner elements 24 are separated by spaces which allow the tuner elements to be inserted, respectively, into different cavities between the anode vanes 12. A first group of spaces 39 comprises slots which extend from the lower edge of the tuner elements 24 up between the tuner elements for substantially the length of the tuner elements 24. Slots 39 are positioned between alternate pairs of tuner elements 24. The remaining pairs of tuner elements 24 are separated by slots 40 which extend up between the tuner elements 24 and terminate in rectangular apertures 41 which extend up to upper support ring 26. The electrical length of the slots 40 and apertures 41 is equivalent to a slot having a much greater length than the total length of the slots 40 and apertures 41. Thus, a tuner structure may be built utilizing the rising sun principle for spreading the tuner resonances which has a considerably shorter overall length than would be possible by the use of slotted shapes alone.

Figure 5:
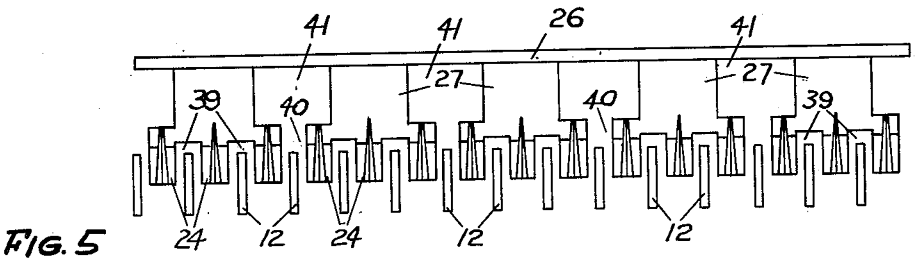

Referring now to Fig. 5, there is shown a development view of a further modification of a tuner structure, wherein the upper support ring 26 and support member 27 position the tuner elements 24 in the cavities between the anode vanes 12. A first group of spaces 39 between the tuner elements 24 comprises slots extending upwardly between the tuner elements 24 for substantially the length of the tuner elements 24, and a second group of spaces comprises slots 40 which extend up between the tuner elements 24 and terminate in rectangular apertures 41. Two spaces 39 are positioned between every pair of spaces comprising slots 40 and apertures 41.

Figure 6:
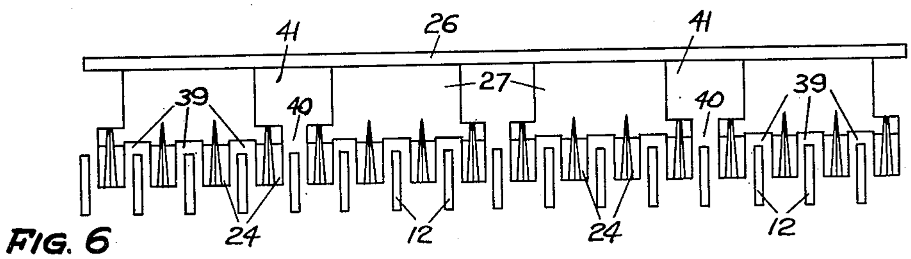

Fig. 6 illustrates a further modification of this invention which is similar to that disclosed in Fig. 5, except that three slots 39 are positioned between each pair of spaces comprising slots 40 and apertures 41.

Figure 7:
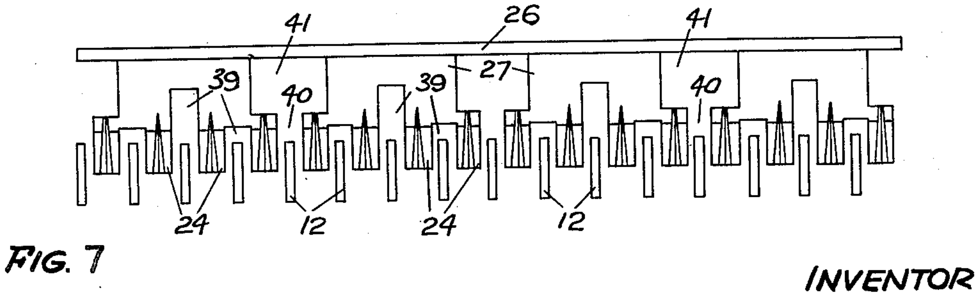

Fig. 7 illustrates a still further modification of this invention which is similar to that illustrated in Fig. 6, except that the middle slot of the group of three slots 39, which is positioned between pairs of spaces comprising slots 40 and apertures 41, extends farther into the support member 27 than the slots 39 adjacent thereto.

The modification of the device shown in Figs. 1, 2 and 3 has a tuner structure which is similar to that shown in Fig. 7, except that the middle slot 39 extends up to the support ring 26.

It is to be clearly understood that the modifications of the tuner structure shown herein are by way of example only, and any desired sequence of slot groups may be used. Indeed, the sequencing of the slots may be random, if so desired.

This completes the description of the particular embodiments of the invention illustrated herein. However, many modifications thereof will be apparent to persons skilled in the art without departing from the spirit and scope of this invention. For example, any desired magnetron-anode configuration may be used, and the tuner structure is not necessarily limited to structures having motion parallel to the axis of the electron-discharge device, but may rather accomplish tuning by radial or circumferential motion of the tuner elements. Accordingly, it is desired that this invention be not limited by the particular details described herein, except as defined by the appended claims.

What is claimed is:

1. An electron-discharge device comprising a cathode, an anode structure spaced from said cathode, said anode structure defining a cavity resonator having a plurality of cavities, and a tuning structure comprising a plurality of tuning elements movably positioned with respect to said cavity resonator, tuning elements of said tuning structure extending, respectively, into different cavities of said resonator, adjacent tuning elements being separated from each other by spaces, adjacent of said spaces having different shapes.

2. An electron-discharge device comprising a cathode, an anode structure spaced from said cathode, said anode structure defining a cavity resonator having a plurality of cavities, a tuning structure comprising a plurality of tuning elements movably positioned with respect to said cavity resonator, tuning elements of said tuning structure extending, respectively, into different cavities of said resonator, adjacent tuning elements being separated from each other by spaces, adjacent of said spaces having different shapes, and means adjacent said anode structure for producing a magnetic field in the space between said cathode and said anode.

3. An electron-discharge device comprising a cathode, an anode structure spaced from said cathode, said anode structure defining a cavity resonator having a plurality of cavities, and a tuning structure comprising a plurality of tuning elements movably positioned with respect to said cavity resonator, tuning elements of said tuning structure extending, respectively, into different cavities of said resonator in the high capacity area of said cavities, adjacent tuning elements being separated from each other by spaces, adjacent of said spaces having different shapes.

4. An electron-discharge device comprising a cathode, an anode structure spaced from said cathode, said anode structure defining a cavity resonator having a plurality of cavities, and a tuning structure comprising a plurality of tuning elements movably positioned with respect to said cavity resonator, tuning elements of said tuning structure extending, respectively, into different cavities of said resonator adjacent said cathode in the high capacity area of said cavities, adjacent tuning elements being separated from each other by spaces, adjacent of said spaces having different shapes.

5. An electron-discharge device comprising a cathode, an anode structure spaced from said cathode, said anode structure defining a cavity resonator having a plurality of cavities, a tuning structure comprising a plurality of tuning elements movably positioned with respect to said cavity resonator, tuning elements of said tuning structure extending, respectively, into different cavities of said resonator in the high capacity area of said cavities, adjacent tuning elements being separated from each other by spaces, adjacent of said spaces having different shapes, and means adjacent said anode structure for producing a magnetic field in the space between said cathode and said anode.

6. An electron-discharge device comprising a cathode, an anode structure spaced from said cathode, said anode structure defining a cavity resonator having a plurality of cavities, a tuning structure comprising a plurality of tuning elements movably positioned with respect to said cavity resonator, tuning elements of said tuning structure extending, respectively, into different cavities of said resonator adjacent said cathode in the high capacity area of said cavities, adjacent tuning elements being separated from each other by spaces, adjacent of said spaces having different shapes, and means adjacent said anode structure for producing a magnetic field in the space between said cathode and said anode.

7. An electron-discharge device comprising a cathode, an anode structure spaced from said cathode, said anode structure defining a cavity resonator having a plurality of cavities, a tuning structure comprising a plurality of tuning elements movably positioned with respect to said cavity resonator, tuning elements of said tuning structure extending, respectively, into different cavities of said resonator, adjacent tuning elements being separated from each other by spaces, adjacent of said spaces having different shapes, a member of magnetic material positioned adjacent said cavity resonator and movable with respect thereto, and means for moving said member in conjunction with said tuning structure.

8. An electron-discharge device comprising a cathode, an anode structure spaced from said cathode, said anode structure defining a cavity resonator having a plurality of cavities, and a tuning structure comprising a plurality of tuning elements movably positioned with respect to said cavity resonator, tuning elements of said tuning structure extending, respectively, into different cavities of said resonator, adjacent tuning elements being separated from each other by spaces, said spaces being divided into groups, spaces from one group being, respectively, adjacent spaces from another group, the spaces of a first group comprising slots, and the spaces of a second group comprising slots terminating in enlarged apertures.

9. An electron-discharge device comprising a cathode, an anode structure spaced from said cathode, said anode structure defining a cavity resonator having a plurality of cavities, and a tuning structure comprising a plurality of tuning elements movably positioned with respect to said cavity resonator, tuning elements of said tuning structure extending, respectively, into different cavities of said resonator, adjacent tuning elements being separated from each other by spaces, said spaces being divided into groups, the spaces of a first group comprising slots, and the spaces of a second group comprising slots terminating in enlarged apertures, each pair of spaces of the second group being separated by a plurality of spaces of the first group.

10. An electron-discharge device comprising a cathode, an anode structure spaced from said cathode, said anode structure defining a cavity resonator having a plurality of cavities, and a tuning structure comprising a plurality of tuning elements movably positioned with respect to said cavity resonator, tuning elements of said tuning structure extending, respectively, into different cavities of said resonator, adjacent tuning elements being separated from each other by spaces, said spaces being divided into groups, the spaces of a first group comprising slots, and the spaces of a second group comprising slots terminating in enlarged apertures, each pair of spaces of the second group being separated by two spaces of the first group.

11. An electron-discharge device comprising a cathode, an anode structure spaced from said cathode, said anode structure defining a cavity resonator having a plurality of cavities, and a tuning structure comprising a plurality of tuning elements movably positioned with respect to said cavity resonator, tuning elements of said tuning structure extending, respectively, into different cavities of said resonator, adjacent tuning elements being separated from each other by spaces, said spaces being divided into groups, the spaces of a first group comprising slots, and the spaces of a second group comprising slots terminating in enlarged apertures, each pair of spaces of the second group being separated by three spaces of the first group.

12. An electron-discharge device comprising a cathode, an anode structure spaced from said cathode, said anode structure defining a cavity resonator having a plurality of cavities, and a tuning structure comprising a plurality of tuning elements movably positioned with respect to said cavity resonator, tuning elements of said tuning structure extending, respectively, into different cavities of said resonator, adjacent tuning elements being separated from each other by spaces, said spaces being divided into groups, spaces from one group being, respectively, adjacent spaces from another group, the spaces of a first group comprising slots of different depth, and the spaces of a second group comprising slots terminating in enlarged apertures.

13. An electron-discharge device comprising a cathode, an anode structure spaced from said cathode, said anode structure defining a cavity resonator having a plurality of cavities, and a tuning structure comprising a plurality of tuning elements movably positioned with respect to said cavity resonator, tuning elements of said tuning structure extending, respectively, into different cavities of said resonator, adjacent tuning elements being separated from each other by spaces, said spaces being divided into groups, the spaces of a first group comprising slots of different depth, and the spaces of a second group comprising slots terminating in enlarged apertures, each pair of spaces of the second group being separated by a plurality of spaces of the first group.

ALBERT D. LA RUE.

No references cited.